United States Patent [19]

Lane

[11] 3,740,920

[45] June 26, 1973

[54] METHOD FOR PACKAGING HYBRID CIRCUITS

[75] Inventor: Clyde H. Lane, Rome, N.Y.

[73] Assignee: The United States of America as represented by the Secretary of the Air Force, Washington, D.C.

[22] Filed: May 26, 1971

[21] Appl. No.: 147,095

[52] U.S. Cl. .......... 53/39, 29/588

[51] Int. Cl. .......... B65b 7/28

[58] Field of Search .......... 53/7, 22 R, 86, 88, 53/39; 29/588, 627

[56] References Cited

UNITED STATES PATENTS

| | | | |
|---|---|---|---|
| 2,710,713 | 6/1955 | Slater | 53/22 R |
| 3,065,583 | 11/1962 | Miller | 53/22 R X |
| 3,234,708 | 2/1966 | Berthiaume | 53/88 |

*Primary Examiner*—Travis S. McGehee
*Attorney*—Harry A. Herbert, Jr. and Henry S. Miller, Jr.

[57] ABSTRACT

A method of packaging hybrid or semi-conductor circuit by using an aluminum O-ring which when placed under compression, at an elevated temperature, between a cap or lid and the mounting surface of a silicon oxide base, undergoes a dimensional change thereby preventing the flow of adhesive from contaminating the elements in the semi-conductor compartment.

1 Claim, 2 Drawing Figures

PATENTED JUN 26 1973 3,740,920

INVENTOR.
CLYDE H. LANE
BY Harry A. Herbert Jr. and
Henry S. Miller Jr.
ATTORNEYS

METHOD FOR PACKAGING HYBRID CIRCUITS

BACKGROUND OF THE INVENTION

In the past the fabrication of microelectronic systems has been carried out through the use of small packages. The package provides an envelope for the electrical components and protects them fron damage due to rough handling as well as atmospheric and other conditions. These packages are very small and are generally formed in two parts, a base and a cover.

The base is first formed, then the microelectronic components are placed in the base or flat pack, connected electrically to leads extending through the walls of the housing. After these steps have been taken, a cover is placed on the package, it is sealed and ready to be used.

These established processes have encountered considerable difficulties in sealing the cover to base unit. Due to these problems many circuits must be attempted before a good quality, reliable circuit is obtained thereby raising the cost of a useable item.

Specifically, the difficulties referred to include the contamination of the circuit components by sealing or cementing material finding its way into that area of the package. Another difficulty is the failure to obtain a perfect seal due to base substrates which lack the required evenness on the surface. Further difficulties arise when plastics are used for cementing, as the seals are heated these plastics liberate gases which tend to contaminate the electronic components and cause circuit failure. The problems and difficulties of the prior art are solved and overcome by this invention.

SUMMARY OF THE INVENTION

The invention is a method which will provide an efficient, low cost method of hermetically sealing hybrid circuits or component chips in a hybrid circuit. The method utilizes a metal O-ring and a plastic, glass, solder or alloy preform. The O-ring is placed around the device or circuit to be sealed. The preform, which is larger than the O-ring is also placed around the device. A cap or lid is then placed over the assembly. The flat of the lid is over the O-ring and preform. Pressure is applied to the package and the temperature raised as necessary to cement the lid to the base substrate. The package is then cooled to room temperature and the pressure removed.

It is therefore an object of the invention to provide a new and improved method for packaging hybrid circuits.

It is another object of the invention to provide a new and improved packaging method that prevents sealing material from entering the packaged device.

It is a further object of the invention to provide a new and improved method for packaging microelectronic systems that will protect the system from contamination by gases released from sealing materials.

It is still another object of the invention to provide a new and improved method for packaging electronic circuits which compensates for uneven surfaces.

DESCRIPTION OF PREFERRED EMBODIMENT

Figure 1:
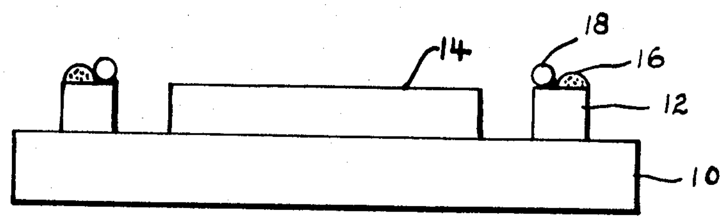
FIG. 1 is a representation of a microelectronic substrate without a cap.

Referring now to FIG. 1, a microelectronic device is formed or placed on a base substrate 10, which could be aluminum oxide. Deposited on the base is a printed conductor pattern. Over the substrate and the printed conductors a suitable dielectric, such as silicon oxide, is deposited. This dielectric, in the form of a ring, surrounds the microelectronic device and covers the printed conductors 14 which could be copper or gold for example. Along the distant edge of the deposited dielectric is an adhesive material 16, placed subsequent to the insertion of the circuitry. A metal O-ring 18 is next placed inwardly and coincentrically of the adhesive material.

Figure 2:
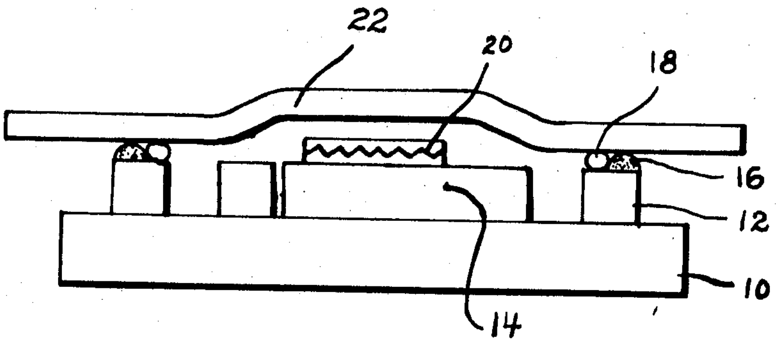
FIG. 2 is a representation of a microelectronic package packaged in accordance with the invention.

FIG. 2 shows a completed package with the circuit 20 inserted in the cavity created by the deposited dielectric 12 and the metal O-ring 18. The lid or cap 22 is affixed to the base of package by using pressure and heating the package to a temperature dependent upon the adhesive utilized. The O-ring 18 has deformed under the applied pressure and a seal is formed between the lid 22 and the deposited dielectric 12 by the adhesive material 16.

Having thus described by process for packaging hybrid circuits, I claim the following as my invention:

1. A process for packaging semi-conductor devices comprising the steps of: placing on a semiconductor substrate base, a microelectronic device to be packaged, surrounding said device with a preform, coating the top outward edge of said preform with an adhesive material, placing a metal O-ring on the top of the preform inwardly of said adhesive and in juxtaposition thereto whereby said O-ring is between said adhesive and micro-electronic device, placing a cap over the preform and including the microelectronic device, applying heat and pressure to the package, removing heat and pressure and allowing the package to cool.

* * * * *